United States Patent [19]

Gladwin

[11] 3,987,972
[45] Oct. 26, 1976

[54] CLOSURE PLATE FOR BOTTLE CRUSHER

[76] Inventor: Floyd R. Gladwin, P.O. Box 1113, South Gate, Mich. 48195

[22] Filed: Nov. 21, 1975

[21] Appl. No.: 634,099

Related U.S. Application Data

[63] Continuation-in-part of Ser. No. 513,698, Oct. 10, 1974, Pat. No. 3,938,745.

[52] U.S. Cl. .................................... 241/99; 241/100
[51] Int. Cl.² ........................................ B02C 13/06
[58] Field of Search .............. 241/32.5, 46 R, 46 A, 241/46 B, 46.08, 101.5, 257 R, 301

[56] References Cited
UNITED STATES PATENTS

| | | | |
|---|---|---|---|
| 2,558,255 | 6/1951 | Johnson et al. | 241/99 |
| 2,948,482 | 8/1960 | Jordan | 241/100.5 |
| 2,980,351 | 4/1961 | Greene | 241/100.5 |
| 3,151,814 | 10/1964 | Morgan et al. | 241/99 |
| 3,756,520 | 9/1973 | Hughes | 241/99 |

Primary Examiner—Granville Y. Custer, Jr.
Attorney, Agent, or Firm—Cullen, Settle, Sloman & Cantor

[57] ABSTRACT

A closure plate to close the open end of a feed chute for a bottle crusher or the like. The closure plate includes a plurality of sheets of relatively stiff but resilient material each having a plurality of equally spaced apart slits extending radially outwardly from the center thereof toward the outer edge of the sheet to form a plurality of flexible tongue segments with the slits of one sheet being offset relative to the slits of the adjacent sheet so that the tongue segments of one sheet overlap the slits of the adjacent sheet. The closure plate may be formed by casting or molding the sheets individually or by providing core plates and a molding cavity and molding a unitary structure with a layer of the stiff, resilient material on each side of each core plate, then slitting the layers to form the tongue segments and then removing the core plates. Alternatively, when molding a unitary structure, the core plates may have outwardly projecting ribs so that the slits in the layers are formed during the molding step.

4 Claims, 10 Drawing Figures

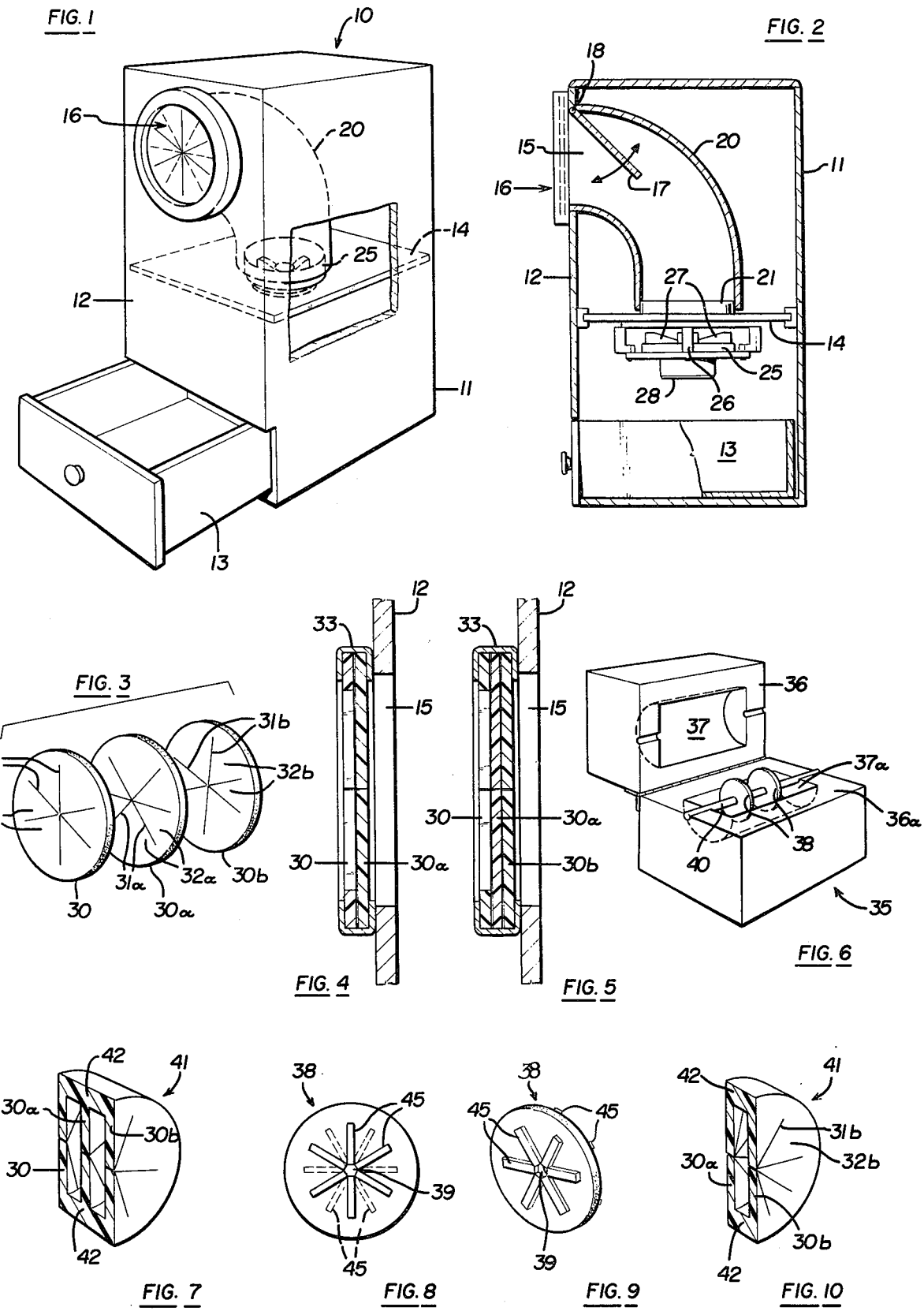

CLOSURE PLATE FOR BOTTLE CRUSHER

CROSS REFERENCE TO RELATED APPLICATIONS

This is a continuation-in-part of my copending application Ser. No. 513,698 filed Oct. 10, 1974, and entitled BOTTLE CRUSHER now U.S. Pat. No. 3,938,745 issued Feb. 17, 1976.

BACKGROUND OF THE INVENTION

Various types of devices have been utilized for breaking, fragmenting or crushing bottles, jars and the like glass articles. These devices generally operate on the principle of a rotatable plate driven by a motor with the plate containing upwardly projecting vanes, ribs or other projections which impact the glass articles to break the same. This type of construction is also used in conventional garbage disposal units. However, there is one problem common to both the bottle crushers and the garbage disposal units, namely, that the impacting, crushing or breaking forces result in flying fragments typically having sharp, jagged edges which tend to be ejected upwardly and out of the crusher or disposal based upon the inertia imparted to them by the rotating plate.

Prior solutions to this problem include the use of a closure plate including a sheet of relatively stiff but resilient material such as rubber or urethane with the sheet having a plurality of equally spaced apart slits extending radially outwardly from the center to form a plurality of flexible tongue segments. Such a structure can be seen on any home garbage disposal unit, for example.

However, this type of closure plate is unsatisfactory because of the ease with which sharp particles may pass through the slits between the tongue segments especially as the closure plate becomes worn.

Thus the invention herein relates to an improved closure plate to close the open end of a feed chute for a bottle crusher or the like and to a method for fabricating such a closure plate.

SUMMARY OF THE INVENTION

The invention herein contemplates a closure plate for the open end of a feed chute of a bottle crusher or the like with the closure plate formed with a plurality of sheets of relatively stiff but resilient material such as rubber or urethane. Each of these sheets has a plurality of equally spaced apart slits extending radially outwardly from the center of the sheet toward the outer edge to form a plurality of flexible tongue segments with the slits of one sheet being offset relative to the slits of the adjacent sheet so that the tongue segments of one sheet overlap the slits of the adjacent sheet. Thus any fragments which would tend to be ejected by penetrating the slits of one sheet are stopped by the overlapping tongues of the adjacent sheet and returned into the feed chute.

The invention herein contemplates forming the closure plate either by casting or molding the sheets individually and then slitting the sheets and assembling them together or alternatively by molding a unitary structure with core plates positioned in a mold so that the unitary structure has a layer of the resilient material on each side of each core plate. The layers are slit to form the tongue segments and then the core plates are removed. If the core plates are provided with rib-like projections, then when the layers are molded the tongue segments are formed in each layer.

BRIEF DESCRIPTION OF THE DRAWINGS

The various objects and advantages of the present invention will become apparent upon reading the following detailed description taken in conjunction with the drawings.

In the drawings, wherein like reference numerals identify corresponding components:

FIG. 1 is a perspective illustration of a bottle crusher or breaker including a closure plate of the present invention and with the internal construction of the crusher shown in dotted lines;

FIG. 2 is a cross sectional side elevation view of the bottle crusher of FIG. 1;

FIG. 3 is a perspective view of a plurality of sheets which make up the closure plate of the present invention;

FIG. 4 is an enlarged fragmentary cross sectional view of the closure plate through which bottles are inserted illustrating the use of two layers of material in the closure plate;

FIG. 5 is an enlarged fragmentary cross sectional view of the closure plate through which the bottles are inserted illustrating the use of three layers of resilient material;

FIG. 6 is a perspective illustration of a mold for molding a closure plate as a unitary structure according to the principles of the present invention;

FIG. 7 is a fragmentary perspective illustration of a closure plate having three layers and molded as a unitary structure in the mold of FIG. 6;

FIG. 8 is a front view of a core plate to be used in the mold of FIG. 6;

FIG. 9 is a perspective illustration of the core plate of FIG. 8; and

FIG. 10 is a fragmentary perspective illustration of a closure plate molded as a unitary structure having two layers.

DETAILED DESCRIPTION OF THE INVENTION

The glass bottle or article breaker or crusher, generally designated as 10, includes a suitable cabinet or housing 11 having a front wall 12, a bottom pull-out drawer 13 mounted for opening and closing manually, and a central horizontally located partition or plate 14.

An opening 15 is formed at the upper end of the front wall 12 and the opening is covered by a closure plate 16 made according to the principles of the present invention. Preferably, an additional rigid flap or door 17, secured by a conventional hinge 18 to the upper end of the opening 15, is provided to insure against the return passage through the opening 15 of fragments. The flap or door may be suspended by gravity over the opening or, alternatively, a conventional spring-type hinge may be used for urging the door into a normally vertical position.

Mounted inside of the cabinet is a curved feed chute 20 formed in the shape of a larger diameter sheet metal tubular elbow curving inwardly and downwardly with its open upper end aligned with the opening 15 in the front wall and having an open lower end fitted around a raised ring 21 formed on the partition or plate 14. An opening is formed in the center of the partition or plate 14 and arranged in the opening, below the ring, is a flat breaker plate or impacter or crusher 25 having a central hub 26. The upper surface of the crusher or breaker plate 25 is provided with a plurality of ribs or vanes 27. A motor 28 is positioned vertically below the breaker plate 25 and is connected by means of a conventional key or set screw to the hub 26 for rotating the plate. The foregoing structure together with other structure is more completely disclosed in my copending application which is herein incorporated by reference.

The closure plate of the present invention includes a plurality of generally circular, thin resilient but relatively stiff sheets or layers 30, 30a, 30b each having a plurality of equally spaced apart radially outwardly directed slits 31, 31a, 31b formed therein with the slits extending from the center of each sheet toward the outer edge. The slits define tongue segments 32, 32a, 32b on each sheet or layer and these tongue segments are relatively flexible.

According to the principles of the present invention, the slits of each sheet are angularly offset relative to the slits of the adjacent sheet so that the tongue segments of one sheet overlap the slits of the adjacent sheet. By this construction, should any fragments pass through the slits of one sheet the fragments are prevented from being ejected out of the crusher by the tongue segment of the next adjacent sheet.

The present invention contemplates a closure plate having a plurality of sheets or layers 30 such as two, three or even more layers. The sheets or layers may be cut out of larger sheets of rubber or urethane or other suitable material having the desired properties of stiffness and flexibility. The slits 31, 31a, 31b may be manually cut in each sheet such as by a knife or alternatively may be formed in each sheet 30 as it is cut out of a larger sheet by a suitably shaped cutting die.

FIG. 4 is a sectional view illustrating a closure plate 16 having two sheets or layers 30, 30a. A suitable molding 33, which may be of metal or of the same material as the sheets or layers, secures the sheets together at their outer periphery and to the front wall 12 of the bottle crusher of the present invention. The molding 33 may, for example, be adhesively secured to the front wall 12 if it is of a plastic material or suitably clamped to the front wall if it is of a metallic material.

The individual sheets or layers 30 are sufficiently resilient so that glass articles and the like may be manually pushed through the center of the sheets thus forcing aside the generally triangular shaped tongue flaps formed between the slits and with the flaps or tongue segments returning to their normal flat or closed position upon passage of the article therethrough.

Thus in operation of the bottle crusher, the articles to be broken are inserted through the closure plate 16 by merely pushing the article sufficiently therethrough to cause the tongue segments to separate and to cause the door 17 to swing upwardly out of the way. The glass article falls down the chute 20 where it lands on the vanes 27 of the rotating breaker plate 25 thus causing the glass to break.

The continual impacting of the rotating plate 25 repeatedly fragments the glass into smaller and smaller particles until they are of such a small size as to be thrown radially outwardly of the breaker plates 25 and below the partition or plate 14 where they land in the drawer 13.

Since the present invention contemplates the use of two or more layers or sheets in the formation of the closure plate, FIG. 5 illustrates in cross sectional fragmentary view the front wall 12 of the bottle crusher having a closure plate 16 formed of three such sheets or layers. Again, a molding 33 fastens the outer edges of the sheets to each other and the entire closure plate 16 to the front wall 12 of the bottle crusher.

As an alternative method of fabricating the closure plate 16, the closure plate may be formed as a unitary structure such as by molding in a mold 35 having upper and lower mold members 36, 36a, respectively, each having mold cavities 37, 37a. A metallic core plate or core pin 38 having an apertured center 39 is mounted on an elongated rod 40 positioned in the mold cavity 37a. Then, when the mold halves are closed and the plastic or rubber material injection molded, a unitary structure 41 is formed having a plurality of layers of material with one layer on each side of each core plate. Each layer of the unitary structure is then cut to provide the slits 31 and the core plates are then removed. The resiliency of the material permits the core plates to be removed in the same fashion that the material allows the bottles to be pushed therethrough for feeding into the bottle crusher. Specifically, the various tongued segments flex to permit the core plates to be removed.

Since the core plates 38 are of smaller diameter than the mold cavity, the unitary structure 41 includes a connecting web 42 which remains after the core plates are removed. The web interconnects each of the layers 30. It is to provide the layers and web 42 that the smaller diameter core plates 38 are placed on rod 40 in the layer mold cavity. The core plates 38 in FIG. 6 have flat sides.

As an alternate method of molding the unitary structure, the core plates 38 may have a plurality of ribs or projections 45 on each side thereof with the ribs on one side being offset relative to the ribs on the other side. The ribs 45 are of sufficient height to contact the side walls of the cavity and also to contact the adjacent core plate when more than one core plate 38 is utilized in the mold. According to this technique only one such core plate would have ribs on both sides with the remaining core plates having ribs on only one side. Then the ribs would contact either the side wall of the mold cavity or the flat side of the adjacent core plate. Then, during the molding operation, the tongue segments 32 are formed in each layer and the core plate may be removed from the unitary structure in the same fashion as previously explained.

Since the present invention contemplates a closure plate having two or more layers or sheets of relatively stiff but resilient material, a closure plate formed of two layers 30a, 30b may be molded as a unitary structure 41 as illustrated in FIG. 10 wherein only one core plate 38 would be utilized. Obviously, the size of the mold and the number of core plates will determine the number of layers in the closure plate when a unitary molded structure is formed.

Having fully described an operative embodiment of this invention what is claimed is:

1. In a bottle crusher or the like, including a generally downwardly directed chute having an open upper end into which glass bottles and the like may be inserted and an open lower end for feeding the glass bottles to a rotatable impacting member which fragments the glass bottles, the improvement comprising:
   a closure plate for the open end of the chute, said closure plate formed of a plurality of sheets of relatively stiff but resilient material in adjacent face-to-face contact,
   each of said sheets having a plurality of equally spaced apart slits extending radially outwardly from the center of each sheet toward the outer edge thereof to form a plurality of flexible tongue segments;

the slits of each sheet being relatively narrow in comparison to the width of the tongues so that each sheet substantially closes the open upper end of the chute;

the slits of one sheet being offset relative to the slits of the adjacent sheet so that the tongue segments of one sheet overlap the slits of the adjacent sheet;

whereby glass bottles and the like may be pushed through the sheets due to the spreading apart of the tongue segments thereof at the slits but with the tongue segments normally remaining together to seal against glass fragments being ejected from the upper end of the chute under the influence of the impacting member.

2. The invention as defined in claim 1, wherein said closure plate has two sheets.

3. The invention as defined in claim 1, wherein said closure plate includes a retaining ring secured to the outer edges of at least the outermost sheets.

4. A closure plate formed of a relatively stiff but resilient material comprising:

at least three sheets of relatively stiff but resilient material each of said sheets having a plurality of equally spaced apart slits extending radially outwardly from the center of each sheet toward the outer edge thereof to form a plurality of flexible segments;

the slits of each sheet being relatively narrow in comparison to the width of the tongues so that each sheet substantially closes the open upper end of the chute;

the slits of one sheet being offset relative to the slits of the adjacent sheet so that the flexible segments of one sheet overlap the slits of the adjacent sheet; and a web of said relatively stiff but resilient material, said web connecting the outer edge of each sheet with the outer edge of the adjacent sheet to form a unitary structure.

* * * * *